United States Patent [19]

Pinch et al.

[11] Patent Number: 5,275,389
[45] Date of Patent: Jan. 4, 1994

[54] JOUNCE BUMPER AND DUST SHIELD SUBASSEMBLY FOR A SUSPENSION DAMPER

[75] Inventors: William D. Pinch, Dearborn; Raymond F. Le Blanc, White Lake, both of Mich.; Chris F. Keller, Jr., Dayton, Ohio

[73] Assignee: Saturn Corporation, Troy, Mich.

[21] Appl. No.: 781,809

[22] Filed: Oct. 23, 1991

[51] Int. Cl.⁵ .................... F16F 13/00; B60G 11/42
[52] U.S. Cl. .................................... 267/220; 267/33; 280/668
[58] Field of Search .............. 267/220, 292, 293, 294, 267/33, 153; 188/321.11, 322.12; 280/668, 673, 716

[56] References Cited

U.S. PATENT DOCUMENTS

| | | | |
|---|---|---|---|
| 4,042,259 | 8/1977 | Fiedler et al. | 280/701 |
| 4,256,292 | 3/1981 | Sullivan, Jr. et al. | 267/220 |
| 4,260,176 | 4/1981 | Pacis et al. | 280/668 |
| 4,462,608 | 7/1984 | Lederman | 267/220 |
| 4,618,127 | 10/1986 | Le Salver et al. | 267/33 |
| 4,681,304 | 7/1987 | Hassan | 267/220 |
| 4,690,425 | 9/1987 | Kubo | 280/668 |
| 4,711,463 | 12/1987 | Knable et al. | 280/668 |
| 4,721,325 | 1/1988 | Mackenjack et al. | 280/668 |
| 4,771,996 | 9/1988 | Martinez, Jr. et al. | 267/220 |
| 4,779,855 | 10/1988 | Tanaka | 267/220 |
| 4,804,169 | 2/1989 | Hassan | 267/220 |
| 4,969,542 | 11/1990 | Athmer et al. | 188/322.12 |
| 5,078,370 | 1/1992 | McClellan | 280/668 |

FOREIGN PATENT DOCUMENTS

| | | | |
|---|---|---|---|
| 0407360 | 1/1991 | European Pat. Off. | 280/668 |
| 3532681 | 3/1987 | Fed. Rep. of Germany | 280/668 |
| 0275811 | 11/1987 | Japan | 267/220 |
| 0787819 | 12/1957 | United Kingdom | 188/321.11 |

Primary Examiner—Robert J. Oberleitner
Assistant Examiner—Chris Schwartz
Attorney, Agent, or Firm—A. Michael Tucker

[57] ABSTRACT

A jounce bumper and dust shield subassembly includes a washer having an annular opening for receiving a piston rod of a damper. A jounce bumper includes an axial bore for receiving the piston rod and top and bottom surfaces. A resilient collar is provided on the top surface of the jounce bumper. A dust shield includes a body and a planar end surface having an annular opening for receiving the piston rod. The planar end surface of the dust shield is placed against a lower surface of the washer so that their respective openings are aligned. The collar of the jounce bumper is inserted through the dust shield and the openings of the dust shield and washer to trap the planer end surface between the jounce bumper and the washer, thereby forming a subassembly.

8 Claims, 1 Drawing Sheet

JOUNCE BUMPER AND DUST SHIELD SUBASSEMBLY FOR A SUSPENSION DAMPER

BACKGROUND OF THE INVENTION

1. Field of the Invention

The present invention relates generally to suspension dampers for vehicles and, in particular, is concerned with a jounce bumper and dust shield subassembly for use between an upper mount assembly and a damper.

2. Description of the Related Art

Dampers, e.g., shock absorbers and struts, for suspension systems in automobiles are well-known. In order to protect a damper and its telescopic piston rod and seals from contaminants such as dirt, gravel, etc., dust shields have been utilized. Generally, a dust shield, also known as a dust tube, is a tubular, molded member formed from rubber or the like. The dust shield has a hollow cylindrical body slipped over an upper end of a damper. Many dust shields include a portion of inner and outer convolutions on the outer surface of the body. Such convolutions provide a spring-like effect by permitting the dust shield to be compressed when the damper is in a compression stroke and causing the dust shield to expand to its approximate original length during rebound of the damper.

A jounce bumper is a tubular, elastomeric member slipped over the piston rod. The jounce bumper is compressed as a damper bottoms out on a compression or jounce stroke to dissipate jounce energy.

Various methods have been utilized to attach a jounce bumper and a dust shield to a damper. In some instances, an annular rib or groove is formed on an outer surface of the jounce bumper. An upper end of the dust shield is fitted over the rib or in the groove to retain the dust shield on the jounce bumper. In other applications, a dust shield is fitted over a washer of an upper mount assembly and covers a jounce bumper. In still other cases, fasteners are used to connect flanges on the dust shield and the jounce bumper to the upper mount assembly. In yet other cases, the dust shield and jounce bumper are formed as an integral member.

It is desirable to provide a jounce bumper and dust shield subassembly which can be easily and economically formed and inserted between a damper and an upper mount assembly in a vehicle.

SUMMARY OF THE INVENTION

The present invention includes a dust shield and jounce bumper subassembly and method of assembly thereof. The subassembly can be easily and economically formed using conventional dust shields, and can be mounted between conventional dampers and upper mount assemblies. The subassembly provides a positive attachment of the parts without the use of fasteners or bonding agents.

In a preferred embodiment, a jounce bumper and dust shield subassembly includes a washer having an annular opening for receiving a piston rod of a damper. A jounce bumper includes an axial bore for receiving the piston rod and top and bottom surfaces. A resilient collar is provided on the top surface of the jounce bumper. A dust shield includes a body and a planar end surface having an annular opening for receiving the piston rod. The planar end surface of the dust shield is placed against a lower surface of the washer so that their respective openings are aligned. The collar of the jounce bumper is inserted through the dust shield and the openings of the dust shield and washer to trap the planar end surface between the jounce bumper and the washer, thereby forming a subassembly.

DETAILED DESCRIPTION OF THE PREFERRED EMBODIMENT

Figure 1:
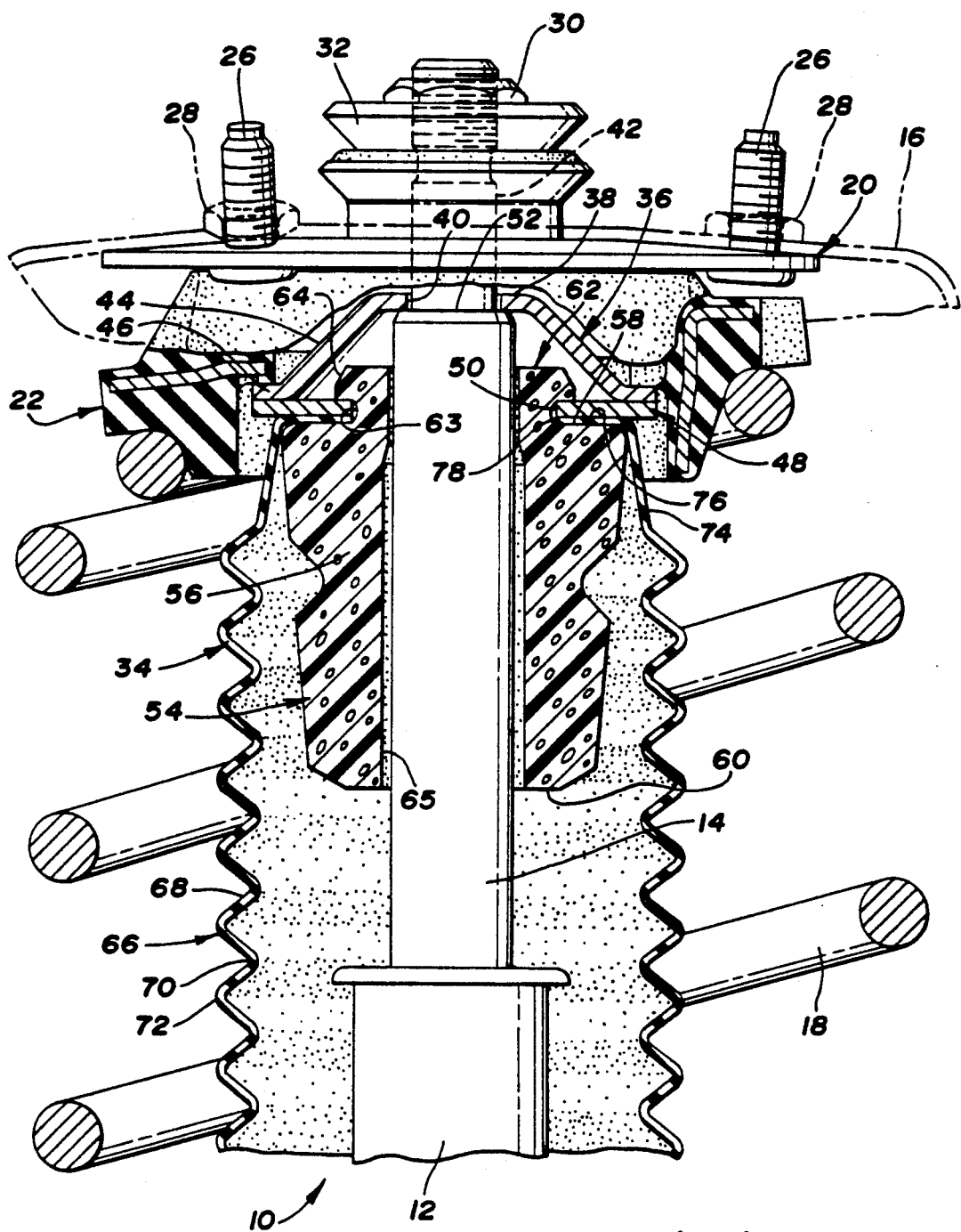
FIG. 1 is a longitudinal sectional view illustrating a preferred embodiment of the present jounce bumper and dust shield subassembly mounted between a damper and an upper mount assembly.

A conventional damper is indicated generally at 10 in FIG. 1 and includes a reservoir tube 12 mounting a reciprocable piston rod 14. The damper 10 is mounted between a wheel assembly (not illustrated) and a vehicular body 16 and undergoes compression and rebound as it dissipates energy from a spring 18 in a well-known manner.

An upper mount assembly 20 is provided to mount the damper 10 to the body 16. The upper end of the spring 18 is seated on an isolator 22, preferably having an elastomeric covering. A bearing set (not illustrated) can be provided between the isolator 22 and the upper mount assembly 20. The assembly 20 includes upwardly projecting threaded fasteners 26 which receive nuts 28 to retain the assembly 20 on the body 16. The piston rod 14 projects upwardly through the isolator 22 and the upper mount assembly 20 and is retained by a nut 30 threaded against an upper rate washer 32.

A jounce bumper and dust shield subassembly 34 according to the present invention is provided between the damper 10 and the isolator 22. The subassembly 34 includes a washer cup 36 having a top planar surface 38 and an annular opening 40 for receiving a reduced-diameter portion 42 of the piston rod 14. A radially-expanding side wall 44 projects downwardly from the top planar surface 38 and terminates in a flange portion 46. A planar washer 48 having an annular opening 50 larger than opening 40 is secured to the flange 46 by any suitable means, e.g., welding. When installed on the piston rod 14, the top planar surface 38 rests against a shoulder 52 in the piston rod 14 to seat the washer cup 36 and washer 48 with respect to the piston rod 14.

A jounce bumper 54 is a tubular member formed from an elastomeric material. The jounce bumper 54 includes a generally cylindrical body 56 and generally planar top and bottom end surfaces 58,60. A resilient collar 62 is preferably integrally formed with the top surface 58. The diameter of the preferably annular collar 62 is sized so that its undeformed state is greater than the diameter of opening 50 and it is capable of elastically deforming as it passes through the opening 50 in the washer 48 and then expanding to its approximate original size after it passes through the opening 50. Preferably, a groove 63 is provided in the outer surface of the collar 62 for receiving the washer 48. A cam surface 64 enhances the insertion of the collar 62 through the opening 50. An axial bore 65 is provided through the body 56 and collar 62 for receiving the piston rod 14.

A dust shield 66 is a tubular member preferably formed from an elastomeric material. A dust shield suitable for use with the present subassembly 34 is disclosed in U.S. Pat. No. 4,969,542, "Dust Shield for a Damper," issued Nov. 13, 1990, assigned to the present assignee and hereby incorporated by reference.

The dust shield 66 includes a hollow cylindrical body 68 having a plurality of inner and outer convolutions 70,72. The diameter of the body 68 is sized greater than the diameter of the jounce bumper 54 so that the dust shield 66 covers and does not interfere with the jounce bumper 54 when mounted on the piston rod 14. An upper end of the dust shield 66 includes a conical portion 74 having an upper planar surface 76. An annular opening 78 is provided in the upper planar surface 76 of sufficient size to receive the piston rod 14.

To assemble the subassembly 34, the upper planar surface 76 of the dust shield 66 is placed in contact with a lower surface of the washer 48 so that respective openings 78,50 are aligned. The jounce bumper 54 is inserted from a lower end of the dust shield 66 through the body 68 until the collar 62 passes through the opening 50 and expands radially outwardly so that the collar 62 rests on an upper surface of the washer 48. The groove 63 seats the washer 48. After the collar 62 is inserted through the opening 50, the dust shield 66 is trapped between the jounce bumper 54 and the washer 48, eliminating the need for fasteners, bonding agents or other means used in the prior art.

The subassembly 34 is easily and quickly inserted over the piston rod 14 prior to the installation of the damper 10. As the subassembly 34 is fitted, the piston rod 14 is received through the axial bore 65 and the opening 40 of the washer cup 36. As described above, the piston rod 14 is retained to the upper mount assembly 20 by the nut 30.

Although the present invention has been described with reference to a preferred embodiment, workers skilled in the art will recognize that changes may be made in form and detail without departing from the spirit and scope of the invention. The relative terms used in this description like "upper," "lower," "top," and "bottom" are used for ease of reference and are not intended to unduly limit the scope of the invention.

The embodiments of the invention in which an exclusive property or privilege is claimed are defined as follows:

1. A jounce bumper and dust shield subassembly comprising:
   (a) washer cup means including
      (i) a washer cup having a first annular opening in a substantially planar upper surface and a radially-expanding side wall terminating in a flange, and
      (ii) a second annular opening, aligned with the first opening, formed in retention means provided below the upper surface, the retention means including a substantially planar washer secured to the flange;
   (b) a jounce bumper having a generally tubular body, top and bottom end surfaces, and an integral resilient collar, formed on the top surface, projecting through the second opening of the retention means to retain the jounce bumper to the washer cup means; and
   (c) a dust shield having a body of a diameter greater than a diameter of the jounce bumper body and first and second end portions, wherein the first end portion includes a planar surface substantially perpendicular to an axis of the dust shield body and an annular opening in the planar surface receiving the collar, wherein the planar surface is trapped between the top surface of the jounce bumper and the retention means of the washer cup means.

2. The subassembly specified in claim 1 wherein the jounce bumper is formed from an elastomeric material.

3. The subassembly specified in claim 1 wherein an undeformed diameter of the collar is greater than a diameter of the opening in the washer cup means.

4. The subassembly specified in claim 1 including a cam surface on the collar.

5. A vehicular suspension system comprising:
   (a) a damper having a piston rod telescopically projecting from one end thereof;
   (b) upper mount means for securing the piston rod to a support structure;
   (c) spring means operatively disposed between the upper mount means and the strut;
   (d) washer cup means, mounted on the piston rod below the upper mount means, having a first opening in an upper surface and a second opening in a lower, retention surface, wherein the first and second openings are aligned, wherein the washer cup means includes
      (i) a washer cup having a substantially planar upper surface with an annular opening receiving the piston rod and a radially-expanding side wall terminating in a flange; and
      (ii) a substantially planar washer secured to the flange and including an annular opening;
   (e) a dust shield having an opening in an end planar surface; and
   (f) a jounce bumper having a resilient collar inserted through the opening of the dust shield planar surface and the second opening of the washer cup means so that the dust shield planar surface is trapped between the jounce bumper and the washer cup means as the collar retains the jounce bumper to the washer cup means.

6. The system specified in claim 5 wherein the jounce bumper is formed from an elastomeric material.

7. The system specified in claim 5 wherein an undeformed diameter of the collar is greater than a diameter of the opening in the washer cup means.

8. The system specified in claim 5 including a cam surface on the collar.

* * * * *